(12) United States Patent
Rozendaal et al.

(10) Patent No.: US 12,238,842 B2
(45) Date of Patent: Feb. 25, 2025

(54) DEFINING ONE OR MORE GROUPS IN A CONFIGURABLE SYSTEM BASED ON DEVICE NAME SIMILARITY

(71) Applicant: SIGNIFY HOLDING B.V., Eindhoven (NL)

(72) Inventors: Leendert Teunis Rozendaal, Valkenswaard (NL); Berent Willem Meerbeek, Veldhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 262 days.

(21) Appl. No.: 17/772,244

(22) PCT Filed: Nov. 2, 2020

(86) PCT No.: PCT/EP2020/080667
§ 371 (c)(1),
(2) Date: Apr. 27, 2022

(87) PCT Pub. No.: WO2021/089475
PCT Pub. Date: May 14, 2021

(65) Prior Publication Data
US 2022/0377869 A1    Nov. 24, 2022

(30) Foreign Application Priority Data
Nov. 4, 2019  (EP) ..................... 19206803

(51) Int. Cl.
*H05B 47/19*  (2020.01)
*H04W 84/18*  (2009.01)

(52) U.S. Cl.
CPC ............. *H05B 47/19* (2020.01); *H04W 84/18* (2013.01)

(58) Field of Classification Search
CPC .... H05B 47/175; H05B 47/155; H04W 84/18
See application file for complete search history.

(56) References Cited

U.S. PATENT DOCUMENTS

| | | | |
|---|---|---|---|
| 9,839,089 B1 | 12/2017 | Wang et al. | |
| 11,425,810 B1* | 8/2022 | Daley | H05B 47/17 |
| 2014/0239816 A1 | 8/2014 | Lee et al. | |
| 2015/0120000 A1* | 4/2015 | Coffey | H04L 12/6418 |
| | | | 315/86 |
| 2016/0085431 A1* | 3/2016 | Kim | G06F 3/04847 |
| | | | 715/735 |
| 2017/0070478 A1* | 3/2017 | Park | H04W 12/06 |
| 2017/0105095 A1 | 4/2017 | Um et al. | |
| 2019/0139542 A1* | 5/2019 | Gunther | G05B 15/02 |

FOREIGN PATENT DOCUMENTS

| | | | |
|---|---|---|---|
| WO | WO-2018215459 A1 * | 11/2018 | ............... G06N 5/04 |
| WO | 2020007596 A1 | 1/2020 | |

* cited by examiner

Primary Examiner — Caroline H Jahnige (57) ABSTRACT

A system (1) for configuring a configurable system that comprises a plurality of devices that have been given names is configured to obtain the names given to the plurality of devices, determine which of the plurality of devices have similarities in their names and determine a group (56) comprising a subset of the plurality of devices based on the similarities. The subset comprises multiple devices which have similarities in their names (52-53). The system is further configured to define the group in the configurable system by configuring the configurable system.

11 Claims, 5 Drawing Sheets

DEFINING ONE OR MORE GROUPS IN A CONFIGURABLE SYSTEM BASED ON DEVICE NAME SIMILARITY

CROSS-REFERENCE TO PRIOR APPLICATIONS

This application is the U.S. National Phase application under 35 U.S.C. § 371 of International Application No. PCT/EP2020/080667, filed on Nov. 2, 2020, which claims the benefit of European Patent Application No. 19206803.9, filed on Nov. 4, 2019. These applications are hereby incorporated by reference herein.

FIELD OF THE INVENTION

The invention relates to a system for configuring a configurable system, said configurable system comprising a plurality of devices, said plurality of devices having been given names.

The invention further relates to a method of configuring a configurable system, said configurable system comprising a plurality of devices, said plurality of devices having been given names.

The invention also relates to a computer program product enabling a computer system to perform such a method.

BACKGROUND OF THE INVENTION

In a Hue lighting system, the user typically gives lights names which are meaningful (to him), e.g. "TV left", "TV right", "bathroom mirror", "bathroom ceiling", "kitchen ceiling", "kitchen light strip" or "garden porch". Then he also groups lights into room groups (all kitchen lights into the room "kitchen") and/or makes a group of all the "TV" lights in order to be able to give a voice-control command like "switch on [all] the TV lights". The user may also group a lighting device and sensor device, e.g. to cause the sensor device to trigger the lighting device.

This grouping step means additional effort for the user, and he can also become confused, or overwhelmed with the many options. The amount of effort for the user can be reduced by automatically creating groups. An example of this is disclosed in US 2017/105095 A1.

The method disclosed in US 2017/105095 A1 includes an electronic apparatus receiving data from a plurality of devices, determining a correlation between at least two devices among the plurality of devices on the basis of the received data, determining a position of a first device on the basis of the correlation, grouping the first device and another device positioned in the vicinity of the first device into one group, and automatically creating group information. For example, in the case in which a TV positioned in the living room is turned on after a device senses a motion of a user, the electronic apparatus may receive data from the device and then receive data from the TV. When the electronic apparatus receives data from the TV within a predetermined time after it receives data from the device of which the position is determined, the electronic apparatus may group the device and the TV into the same group and create group information. The name of the first device may be automatically set using the group information.

Although the method disclosed in US 2017/105095 A1 reduces the amount of effort for the user, grouping devices by correlating the times at which data is received only works in certain situations.

WO 2018215459 A1 discloses that a user, when setting up a smart home device, will often inform an environment management system of the rooms that may be in the home by naming a luminaire or naming different spaces. Luminaires may all be part of the same group (e.g. 'living room'). This may be because they are included explicitly in a group as defined within the connected lighting system, or it may be deduced from the names given to the luminaires by the user.

SUMMARY OF THE INVENTION

It is a first object of the invention to provide a system, which is able to automatically define one or more groups of devices without correlating the times at which data is received.

It is a second object of the invention to provide a method, which is able to automatically define one or more groups of devices without correlating the times at which data is received.

In a first aspect of the invention, a system for configuring a configurable system, said configurable system comprising a plurality of devices, said plurality of devices having been given names, comprises at least one input interface, at least one configuration interface, and at least one processor configured to use said at least one input interface to obtain said names given to said plurality of devices, determine which of said plurality of devices have similarities in their names, determine a group comprising a subset of said plurality of devices based on said similarities, said subset comprising multiple devices which have similarities in their names, and use said at least one configuration interface to define said group in said configurable system by configuring said configurable system. Said configurable system may be a lighting system, for example.

By using semantics from the names given by the user to his devices and/or semantics of the names chosen by the devices themselves to define one or more groups, devices may be grouped in situations in which correlating the times at which data is received does not work. For example, it may be beneficial to group devices even if one or more of them do not transmit data upon detecting an event like being switched on or detecting motion. Furthermore, it may be beneficial to be able to use groups before configuring devices to transmit data upon detecting an event.

A user interface or lighting control app may encourage users to provide meaningful light names. For instance, in the UI screen where the user can edit a lamp's name, an instruction may be shown, e.g. "please give the lamp a name which specifies its function, such as "bathroom mirror light" or "dining painting spotlight". The app may also provide (instant) feedback on the strength of the name given.

Said multiple devices may comprise one or more lighting devices and said multiple devices may further comprise one or more sensor devices and/or one or more user input devices. The user input devices may comprise one or more light switches and/or one or more light dimmers, for example. Said at least one processor may be configured to configure said configurable system to control at least one of said one or more lighting devices based on sensor data produced by at least one of said one or more sensor devices and/or based on user input received by said one or more user input devices. As such, said at least one processor may configure said configurable system such that at least one of said one or more lighting devices is controlled based on sensor data when said sensor data is produced by at least one of said one or more sensor devices and/or such that at least one of said one or more lighting devices is controlled based on user input when said user input is received by said one or more user input devices. Said processor may thereby group/link a lighting device with a said sensor device or a user input device. For example, the group may be used to assign a lighting device to a room or to link a lighting device to a sensor device or a user input device.

Said at least one processor may be configured to determine a spatial location of a device of said plurality of devices based on said name given to said device. This makes it easier to setup an entertainment function in which light settings of lighting devices are controlled so as to match video displayed on a display. An app for setting up such an entertainment function typically asks the user to indicate the spatial positions of the lighting devices that provide the entertainment lighting function and it is beneficial to help the user do this.

Said at least one processor may be configured to obtain at least one of said names from at least one of said plurality of devices. Alternatively or additionally, said at least one processor may be configured to obtain at least one of said names from a bridge, for example.

Said at least one processor may be configured to determine said group upon determining that one of said obtained names has changed. By checking, and adjusting if necessary, the grouping when at least one of the device names has changed, the determined group(s) can be kept current.

Said at least one processor may be configured to determine said group by grouping said multiple devices in an existing group. If the subset of devices that have similarities in their names fit in an existing group, e.g. because a "living room" group already exists and the devices have "living" in their names, then it is not necessary to create a new group. By using existing groups whenever possible, the user interface becomes more predictable for the user.

Said multiple devices may comprise at least two devices having a same or similar prefix or word in their names. Devices that have a same or similar prefix or word are good candidates for being grouped. This prefix or word may reflect a room, function or lighting device type, for example. Examples of similar prefixes are "kitchen" and "ktchn".

Said at least one processor may be configured to determine said group in dependence on said similarities between said names of said multiple devices exceeding a threshold value. This threshold value may be exceeded when the same word or same consecutive symbols are present in multiple names, either as prefix or anywhere else in the names. The threshold value may be a minimum number of identical symbols, for example. Alternatively, another technique for determining similarities between text strings may be used. The threshold value may be defined by the user and/or may be pre-configured in the system, for example.

One or more of said names may be given by a user. Names given by a user typically comprise more information that is useful for grouping devices than names not given by the user. Names are not necessarily (only) given by a user. For example, names may also be given by the bridge (e.g. the bridge may allocate names with a string based on the lamp type/model and a unique numerical suffix) and names may also be obtained from a Building Information Model (BIM) (e.g. for professional applications).

Said at least one processor may be configured to determine a group name for said group based on said similarities. This makes it unnecessary for the user to name the group himself and thereby reduces effort for the user. For example, said names of said multiple devices may be indicative of the same room and said at least one processor may be configured to determine, for said group, a group name which identifies said room.

Said at least one processor may be configured to use said at least one input interface to obtain spatial positions, functions and/or types of said plurality of devices and determine said subset of devices by determining which of said plurality of devices have similarities in their names and are similar with respect to their spatial position, function and/or type. This makes it possible to reduce or avoid groupings of devices with similarities in their names that a user does not want to control in the same way, i.e. as a group. As a first example, if two lighting devices have similar names, but are located in different rooms (e.g. two different rooms with a TV and a light named "TV light" in each of the rooms), it is less likely that the user will want to control the two lighting devices in the same way, e.g. simultaneously and/or with the same light settings. As a second example, if three lighting devices have similar names, but only two of them have an entertainment function, it is likely that the user wants to have a group with only the two entertainment lighting devices in it.

In a second aspect of the invention, a method of configuring a configurable system, said configurable system comprising a plurality of devices, said plurality of devices having been given names, comprises obtaining said names given to said plurality of devices, determining which of said plurality of devices have similarities in their names, determining a group comprising a subset of said plurality of devices based on said similarities, said subset comprising multiple devices which have similarities in their names, and defining said group in said configurable system by configuring said configurable system. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for configuring a configurable system, said configurable system comprising a plurality of devices, said plurality of devices having been given names.

The executable operations comprise obtaining said names given to said plurality of devices, determining which of said plurality of devices have similarities in their names, determining a group comprising a subset of said plurality of devices based on said similarities, said subset comprising multiple devices which have similarities in their names, and defining said group in said configurable system by configuring said configurable system.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

DETAILED DESCRIPTION OF THE EMBODIMENTS

Figure 1:
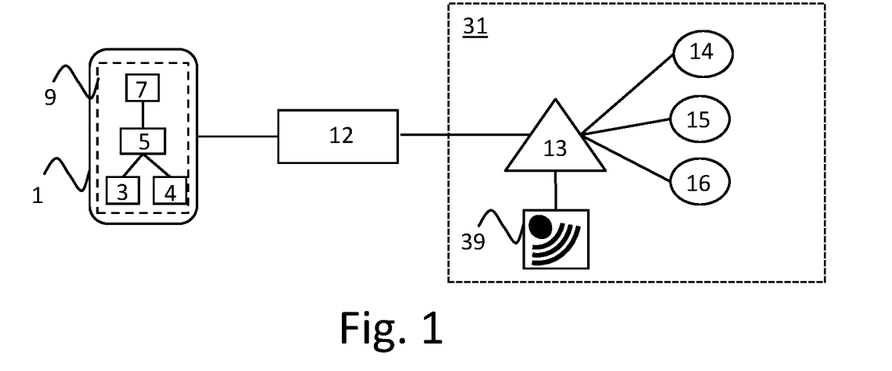
FIG. 1 shows a first embodiment of the system.

FIG. 1 shows a first embodiment of the system for configuring a lighting system. The lighting system 31 comprises a bridge 13, lighting devices 14-16 and a sensor device 39. In the example of FIG. 1, each of the lighting devices 14-16 and presence sensor 39 has been named. The bridge 13 may be a Hue bridge, the lighting devices 14-16 may be Hue lamps and the sensor device 39 may be a Hue motion sensor, for example.

The lighting devices 14-16 can be controlled by a mobile device 1 via the bridge 13. The bridge 13 communicates with the lighting devices 14-16, e.g. using Zigbee technology. The mobile device 1 is connected to a wireless LAN access point 12, e.g. via Wi-Fi. The bridge 13 is also connected to the wireless LAN access point 12, e.g. via Wi-Fi or Ethernet.

In the embodiment of FIG. 1, the system is the mobile device 1. The mobile device 1 comprises a receiver 3, a transmitter 4, a processor 5, memory 7 and a display 9. The processor 5 is configured to use the receiver 3 to obtain the names given to the lighting devices 14-16 and the sensor device 39, e.g. from the bridge 13 or from the devices themselves.

The processor 5 is further configured to determine which of the devices have similarities in their names, determine a group comprising a subset of the devices based on the similarities, and use the transmitter 4 to define the group in the lighting system 31 by configuring the lighting system. The subset, and therefore the group, comprises multiple devices which have similarities in their names, e.g. comprises the sensor device 39 and one or more of lighting devices 14-16 or comprises multiple of the lighting devices 14-16. In an alternative embodiment, the group may be defined in the devices themselves, in the mobile device (e.g. in a lighting control app), or in an Internet server that stores settings of lighting systems, for example.

When adding lighting devices to a lighting system, they are typically given generic names (e.g. based on the type of light) such as "Hue color lamp 3". Before this invention, the user would then need to rename them manually to enable easy recognition and control of the lights. Now, when a user adds a lighting device with a prefix which is already used for other lights (e.g. "TV right" after earlier adding "TV left"), the system can propose to create a group "TV lights" with all the lighting devices having that prefix.

The system may actively prompt the user with the question to create the group and only create the group if the user approves the proposal, or it may pro-actively create the group in the user interface (possibly with a different presentation or an indication which indicates it is a name-based or system-proposed group) until the user explicitly or implicitly rejects it (e.g. by ignoring it). In another embodiment, the user interface may offer a specific option to "automatically group devices based on name" which the user can manually activate or deactivate.

This also allows a voice control system to use the phrase "switch on [all] TV lights" to control those lights, or even when the user says "watch TV" to not only switch on the TV (and other associated equipment such as set-top box and audio system) but also set the lights with "TV" prefix to a level and color comfortable for TV watching.

As another example, if lighting device 14 has been named "living-1", lighting device 15 has been named "living-2" and sensor device 19 has been named "living-S", a group may be created for these three devices. This group may be named "living room", for example.

When the names of room groups and lighting devices are not aligned, this can be advantageously used to create other groups. For example, if a user has a living room with a dining and TV area, the room group may be called "living" while the lights may be called "TV left" and "TV right" and "dining". In typical voice control systems, the user could either control the whole room ("turn on living room") or individual lights ("dim down TV left"), but not the group of lights around the TV ("cosy TV lights"), unless the system allows the option to group lighting devices, and the user has taken the effort to create those groups.

Automatic creation of named groups based on names given to lights is also advantageous in case the user changes the location/function/name of the lights. For example, if the user moves a light from a group to another room in the house and gives it a new name (e.g. from "living room standing light" to "den standing light"), then the light may be removed from the group and possibly added to an existing or new group with similarly named lights. Furthermore, as the named groups are automatically created, the name of the group can be changed to reflect the changes done to the name of the lights. If this is not automated, it is very conceivable that the user forgets to update the name of the group if he has changed the name of the lights.

Position information of a lighting device (e.g. RF detected or being part of room group) may be used to help to avoid unintended grouping for lights with same name in different rooms. For instance, when there are two TVs in a home, there may be multiple lighting devices with "TV" in the name but grouping all of them into a single "TV" group would not make sense; instead, the system can make two "TV" groups with also the name of the room added, e.g. group "living TV" for "TV left" and "TV right" in the living room, and group "bedroom TV" for "TV light strip" in the bedroom—where the room determination can be from e.g. RF detection. In this case, there is no need for the user to make sure all light names are unique or have a clear association to the room in their name.

The system may also suggest not to assign the same (duplicate or similar) name or suggest or auto-apply the room suffix in such cases. The system may also derive meaning from combined information from multiple given names of lighting devices which are detected to be co-located. For instance, if a lighting device named "TV light strip" is detected to be near a lighting device named "bedside lamp", the system may conclude that this light strip should be part of the bedroom TV group.

In the example of FIG. 1, the lighting system 31 does not comprise any user input device (e.g. light switch or light dimmer). However, if one or more user input devices are present, their names may be obtained, and they may be included in a group.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with the wireless LAN access point 12, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may further comprise a camera (not shown). This camera may comprise a CMOS or CCD sensor, for example. The mobile device 1 may comprise other components typical for a mobile device such as a battery and a power connector. The invention may be implemented using a computer program running on one or more processors.

Figure 2:
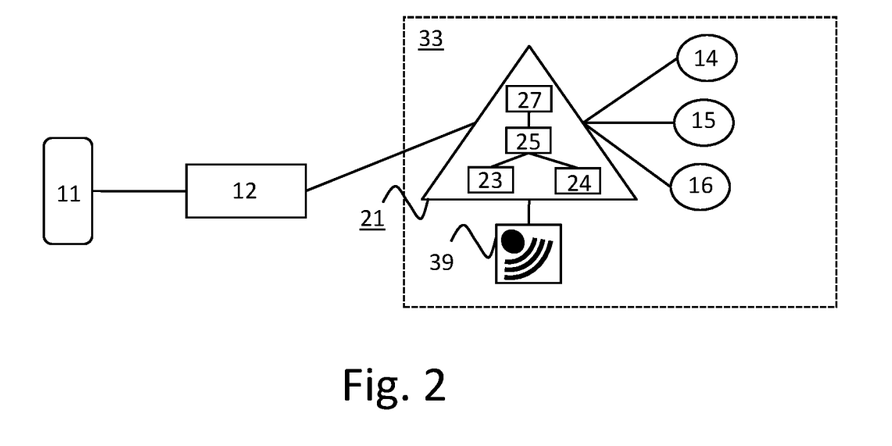
FIG. 2 shows a second embodiment of the system.

FIG. 2 shows a second embodiment of the system for configuring a lighting system: a bridge 21. The lighting system 33 comprises the bridge 21, lighting devices 14-16 and the sensor device 39. The bridge 21 may be a Hue bridge, for example. The lighting devices 14-16 can be controlled with a mobile device 11 via the bridge 21.

The bridge 21 comprises a receiver 23, a transmitter 24, a processor 25, and a memory 27. The processor 25 is configured to use the receiver 23 to obtain the names given to the lighting devices 14-16 and the sensor device 39. The processor 25 may be configured to store the obtained names in memory 27 for later use, for example.

The processor 25 is further configured to determine which of the devices have similarities in their names, determine a group comprising a subset of the plurality of devices based on the similarities, and use an internal interface to define the group in the lighting system by configuring the lighting system.

The subset, and therefore the group, comprises multiple devices which have similarities in their names, e.g. comprises the sensor device 39 and one or more of lighting devices 14-16 or comprises multiple of the lighting devices 14-16. In an alternative embodiment, the group may be defined in the devices themselves or in an Internet server that stores settings of lighting systems, for example.

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The receiver 23 and the transmitter 24 may use one or more wired or wireless communication technologies such as Ethernet to communicate with the wireless LAN access point 12, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The bridge 21 may comprise other components typical for a network device such as a power connector. The invention may be implemented using a computer program running on one or more processors.

In the embodiments of FIGS. 1 and 2, the system is a mobile device or a bridge. In an alternative embodiment, the system may be another device, e.g. a personal computer or a server computer. In the embodiments of FIGS. 1 and 2, the system comprises a single device. In an alternative embodiment, the system comprises multiple devices.

Figure 3:
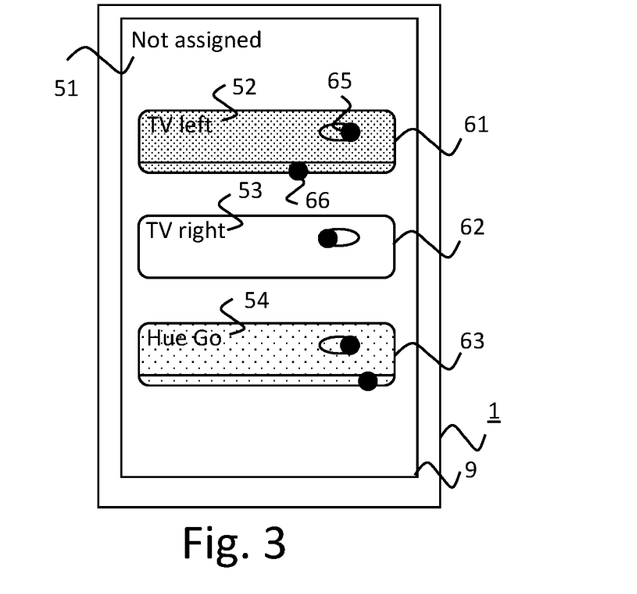
FIG. 3 shows an example of a user interface, currently representing three devices and no groups.

FIG. 3 shows a user interface, e.g. implemented in an app, that allows a user to control lighting devices by using a display 9 of a mobile device 1. The user interface shows three panels 61-63 representing the lighting devices 14-16 of FIG. 1. Each of the panels 61-63 indicates the name of the corresponding lighting device. Name 52 in panel 61 indicates that the lighting device 14 has been named "TV left" (e.g. named by the user). Name 53 in panel 62 indicates that the lighting device 15 has been named "TV right" (e.g. named by the user). Name 54 in panel 63 indicates that the lighting device 16 has been named "Hue Go" (e.g. named by the lighting device itself or named automatically by a bridge based on device type).

Virtual switch 65 of panel 61 indicates whether the light source of lighting device 14 is on or off and allows the user to switch the light source of lighting device 14 on or off. Since the light source is on, a slider 66 is shown to indicate the dim level of the light source and the color of the panel 61 represents the color of the light source. In the example of FIG. 3, none of the lighting devices 14-16 has been assigned to a group and panels 61-63 are therefore shown underneath a title 51 labelled "Not assigned".

Figure 4:
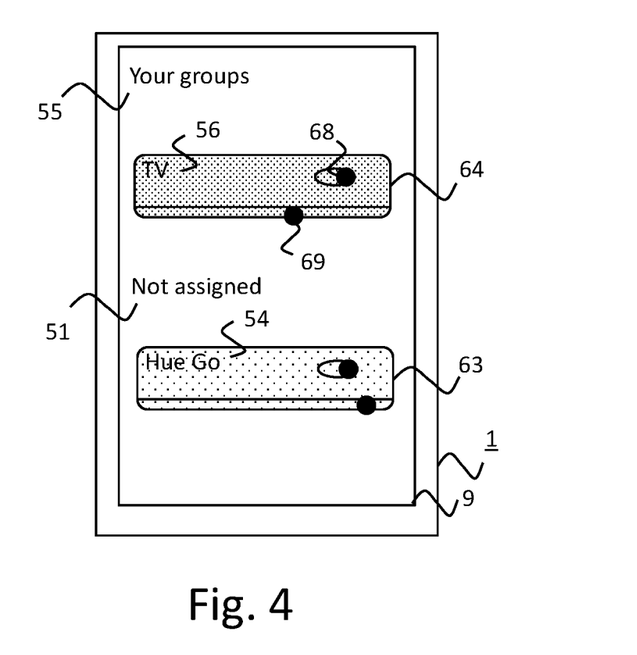
FIG. 4 shows the user interface of FIG. 3, now representing one device and one group.

After the mobile device 1 of FIG. 1 (or the bridge 21 of FIG. 2 if the user interface is displayed on mobile device 11) has determined the similarities between the names of the lighting devices, it creates a group 56 for lighting devices 14 and 15, because they have the same prefix: "TV". This group 56 is represented by panel 64 in the example of FIG. 4. In the example of FIG. 4, a name has been automatically determined for group 56 based on the similarities. This name is the same as the prefix: "TV". The user is able to edit the group name if desired and is able to manually add one or more lighting devices to the group or remove one or more lighting devices from the group.

Figure 5:
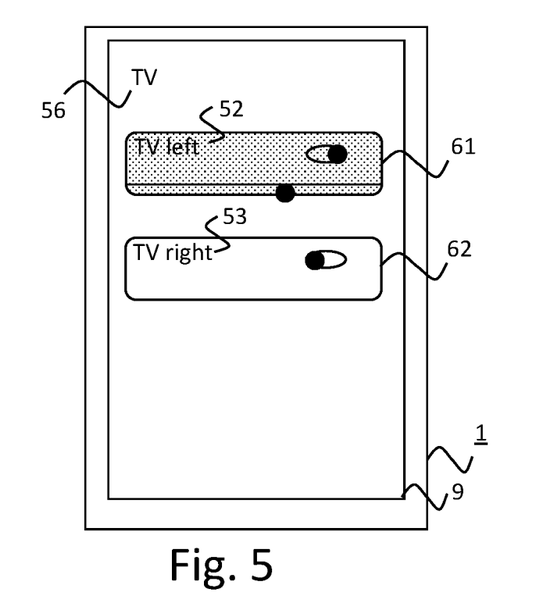
FIG. 5 shows the user interface of FIG. 3, now representing the devices in the group of FIG. 4.

The dim level of both lighting device 14 and lighting device 15 can be controlled in the same way with slider 69. Furthermore, both lighting device 14 and lighting device 15 can be switched on or off simultaneously with virtual switch 68. The group 56 is shown underneath a title 55 labelled "Your groups". The lighting device 16 has not been assigned to a group and the panel 63 is therefore still shown underneath title 51. When the user selects panel 64 in the screen depicted in FIG. 4, the screen of FIG. 5 is shown. In the screen of FIG. 5, the panels 61 and 62 of FIG. 3 are shown as part of group 56.

If the name of one of the lighting devices 14 and 15 is changed, the name of group may be changed and/or the name of the other one of the lighting devices 14 and 15 may be changed automatically. For example, if the user decides to change the name of the lighting device 14 from "TV left" to "home theatre left", the system can automatically (or suggest to) rename lighting device 15 accordingly, e.g. to "home theatre right", and automatically (or suggest to) rename group 56 accordingly, e.g. to "home theatre".

The same principle can be used for a lighting device with multiple independently controllable light elements. For example, a user may normally name such light elements "dining 1" through "dining 5", but after naming the first light element "dining 1", the system (having found four yet unnamed or default-named lights of the same type, and possibly using RSSI measurements for determining proximity of the lights) may suggest to name them "dining 2" through "dining 5", and make a group "dining lights" automatically. Furthermore, the "dining" part of the name may be used to select appropriate scenes linked to the "dining" function of the lighting device/light elements.

In the user interface of FIGS. 3-5, the user is further able to manually rename lighting devices, create groups, delete groups, rename groups, add lighting devices to groups and remove lighting devices from groups. This functionality is not described in detail.

In the example of FIGS. 3-5, no sensor device is represented, e.g. because the lighting system does not comprise a sensor device. If the lighting system does comprise a sensor device, the user may be able to use the user interface to configure the lighting system to control at least one of the one or more lighting devices 14-16 based on sensor data produced by the sensor device by grouping/linking the sensor device and the at least one lighting device.

In the example of FIGS. 3-5, no user input device is represented, e.g. because the lighting system does not comprise a user input device. If the lighting system does comprise a user input device, the user may be able to use the user interface to configure the lighting system to control at least one of the one or more lighting devices 14-16 based on user input received by the user input device by grouping/linking the user input device and the at least one lighting device.

In the user interface of FIGS. 3-5, a device that does not have a similar name as another device is not included in a group. In an alternative embodiment, such a device may still be included in a group. For example, when a user adds a light to his lighting system, and gives it a name which is recognized by the system as being a typical room name (e.g. "bathroom light" where "bathroom" is a recognized name/type), and such a group does not exist yet, the system proposes to create a room group of that type and name, and assigns the light to that room group. Moreover, based on the type of lighting device and/or name suffix, dedicated scenes may be added automatically for use in the room. For instance, for name "bathroom mirror" or type "Hue Adore Vanity Mirror", a "make-up" scene may be added that gives white light of appropriate brightness and color temperature to optimize the handling of make-up in the morning.

Figure 6:
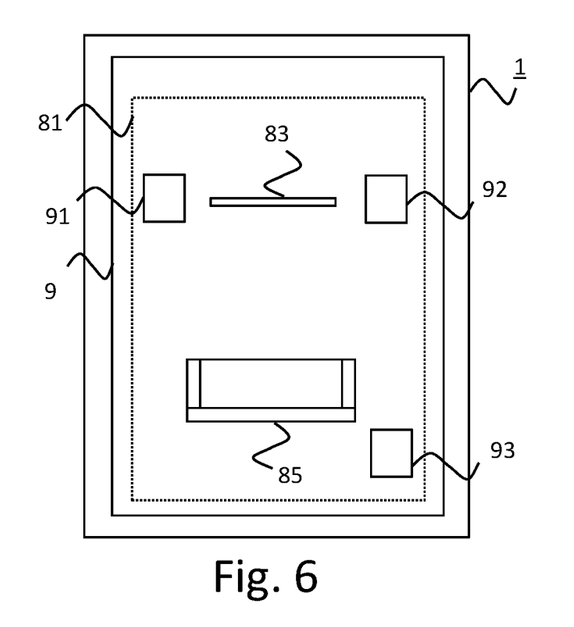
FIG. 6 shows a user interface screen in which devices can be assigned to positions in a room for an entertainment mode.

In the example of FIG. 6, a user interface screen 81 is shown on the display 9 of the mobile device 1 of FIG. 1. This user interface screen 81 may be part of the user interface of FIGS. 3-5 or may be part of a different user interface. In the user interface screen 81, the living room of the user is depicted. In the living room representation, an icon 83 representing a TV, an icon 85 representing a couch and three icons 91, 92 and 93 representing three lighting devices are depicted. These three lighting devices are therefore part of the entertainment group.

The user has placed these three icons at their respective locations using the user interface screen 81. Initially, i.e. before the user placed these icons at their respective locations, the system may have placed these icons randomly in the living room or these icons may have been shown outside the living room, for example. Alternatively, the system may make an educated guess for the locations, e.g. based on the lighting device types. For example, a Hue Signe (floor standing luminaire) will normally be further away from the TV than a Hue Play (which would be placed on the cabinet also supporting the TV and therefore close to the TV).

The system might not represent all lighting devices by icons initially but might instead select a subset of all lighting devices. For example, the system might select the lights which have a name semantics linked to entertainment ("TV . . . ") and/or select the lights which usually have an entertainment function (Hue Play, Hue Go). This selection may be extended with nearby lights (RSSI based, or previously allocated by the user to the same room or control-group).

Based on this information, the lighting devices corresponding to icons 91, 92 and 93, are selected for rendering the light effects synchronized to the media content. The light effects rendered on a lighting device are based on an analysis of a certain region of the video content and this region is selected based on the location of the lighting device, e.g. a left part of the video content for a lighting device left of the TV.

The locations input by the user may also be used to automatically name the lighting devices. For example, the lighting device corresponding to icon 91 may be named "TV left", the lighting device corresponding to icon 92 may be named "TV right" and the lighting device corresponding to icon 93 may be named "Couch". Thus, the names of the lighting devices do not need to be given by a user but may also be given automatically.

In an alternative embodiment, it is the user that has given the names "TV left", "TV right" and "Couch" to three of his lighting devices and these lighting devices are automatically associated with locations based on their names. For example, the lighting device named "TV left" is placed at the position of icon 91 in FIG. 6. In this alternative embodiment, it would normally take the user less time to configure the entertainment mode.

Figure 7:
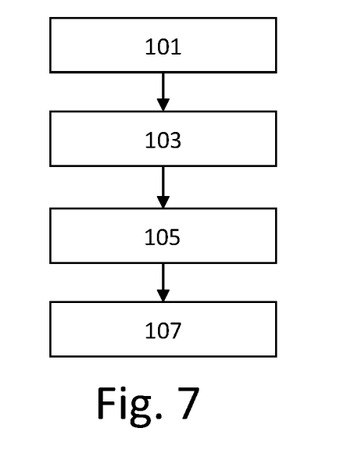
FIG. 7 is a flow diagram of a first embodiment of the method.

A first embodiment of the method of configuring a lighting system is shown in FIG. 7. The lighting system comprises a plurality of devices. The plurality of devices has been given names. A step 101 comprises obtaining the names given to the plurality of devices. A step 103 comprises determining which of the plurality of devices have similarities in their names. A step 105 comprises determining a group comprising a subset of the plurality of devices based on the similarities. The subset comprises multiple devices which have similarities in their names. A step 107 comprises defining the group in the lighting system by configuring the lighting system. The method described in relation to FIG. 7 may be performed by the data processing system of FIG. 8, for example.

Figure 9:
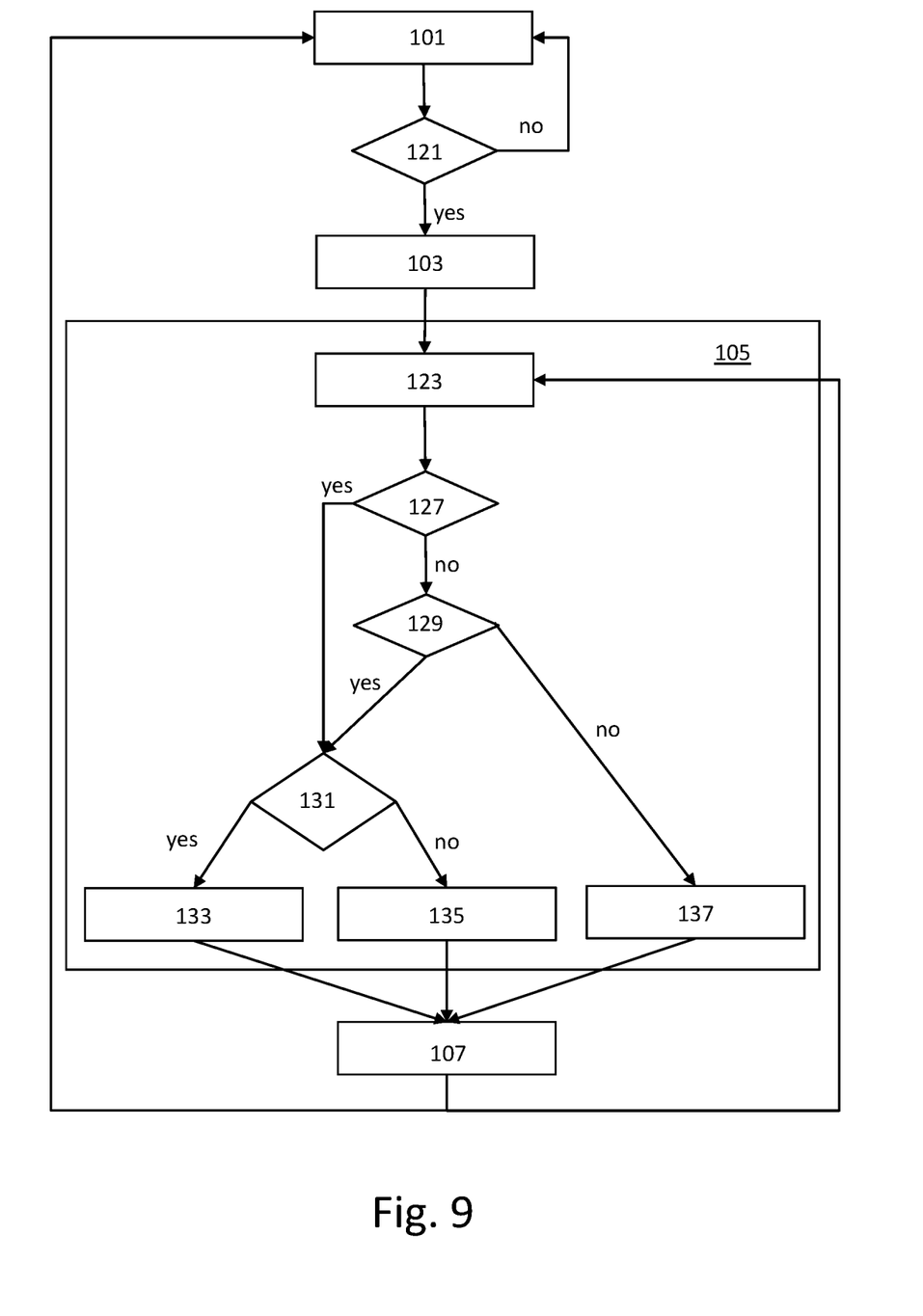
FIG. 9 is a flow diagram of a second embodiment of the method.

A second embodiment of the method of configuring a lighting system is shown in FIG. 9. Step 101 comprises obtaining the names given to the plurality of devices. A step 121 comprises checking whether one or more of the obtained names has changed. Step 103 is performed upon determining that one or more of the obtained names has changed. If none of the obtained names has changed, step 101 is repeated.

Step 103 comprises determining which of the plurality of devices have similarities in their names. Step 105 comprises determining a group comprising a subset of the plurality of devices based on the similarities. In the embodiment of FIG. 9, step 105 comprises sub steps 123 to 137. A step 123 is performed after step 103.

In its first iteration after step 103, step 123 comprises selecting the first set of device names whose similarities exceed a similarity threshold value, e.g. because they comprise a same or similar word (as prefix or somewhere else in their names), and comprises selecting the corresponding devices, which will be grouped together in a group. Next, a step 127 comprises checking whether the device names are indicative of a room, e.g. comprise one of the words "kitchen", "living" or "hall". If so, then step 131 is performed next. If not, then step 129 is performed next.

Step 129 comprises checking whether the device names comprise a same or similar prefix or word. If so, step 131 is performed next. If not, step 137 is performed next. Step 137 comprises creating a new unnamed group and assigning the devices selected in step 123 to this new unnamed group. The user is then able to name the new group manually.

Step 131 comprises checking whether a group with a name indicative of the room determined in step 127 or comprising the prefix or word determined in step 129 already exists. If so, then step 133 is performed. Step 133 comprises adding the devices selected in step 123 to this existing group. If other devices are already included in this group, they are left untouched in one implementation. In another implementation, it is checked whether these devices still fit in this group and if not, they are removed from this group.

If such a group does not exist already, a new group is created in step 135 and this group is given a name that identifies the room determined in step 127 or includes the prefix or word determined in step 129. The devices selected in step 123 are added to this new group. Thus, in step 135, a group name is determined for the group based on the similarities.

Step 107 is performed after steps 133, 135 and 137. Step 107 comprises defining the group in the lighting system by configuring the lighting system. If another set of device names whose similarities exceed a similarity threshold was determined in step 103, this other set, and the corresponding devices, are then selected in a next iteration of step 123. If such a set does not exist, then step 101 is repeated.

In an alternative embodiment, the sets of devices names that are selected in step 123 do not comprise all device names whose similarities exceed the similarity threshold value. Instead, devices that are dissimilar with respect to their spatial position, function and/or type are not grouped, even if their names exceed the similarity threshold value. One or more steps may be performed before step 123 to obtain the spatial positions, functions and/or types of the plurality of devices.

This alternative embodiment may be generalized to an embodiment in which groupings are determined based on other criteria than just device names, e.g.:
- whether lighting devices are configured to take part in a same scene or routine;
- whether lighting devices are excluded from a same scene or routine;
- whether lighting devices have a same or similar type and/or have same or similar color capabilities;
- whether lighting devices are controlled by a same control device and/or are controlled based on sensor data from a same sensor device;
- whether lighting devices are controlled at similar times;
- whether devices are located near each other.

As a first example, if a sensor is an outdoor sensor and a lighting device is an outdoor light, they may be grouped together. Outdoor devices are normally waterproof and are typically placed or used together. An outdoor group name may be selected or recommended for this group.

As a second example, information from a (Zigbee) wireless network may be used to determine whether devices are located near each other. Battery-powered switch/sensor devices are typically implemented as Zigbee End Devices, meaning they search and use a nearby (Zigbee Router) device to function as their parent. This means that the newly added device and the parent device of the newly added device may be grouped together. For Zigbee router devices (including lights), the neighbor table from the added device (or its neighbors already in the system) may be used to make an educated guess as to which devices are located near each other.

If multiple criteria are used, each criterion may be used to rate whether a device should be included in a candidate group. After all criteria have been evaluated, final groups may be determined by determining which candidate groups have at least two devices whose rating for that group exceeds an inclusion threshold.

For example, if three lighting devices participate in the same scene, a candidate group may be created, and an initial rating may be given to the three lighting devices that exceeds an inclusion threshold. If one of these three devices then appears to be located in a neighboring room, its rating may be lowered, e.g. below the inclusion threshold. If two other lighting devices have similar names, a further candidate group may be created, and an initial rating may be given to the two lighting devices that exceeds the inclusion threshold.

The naming of the devices and/or the groups in the lighting system may further be used to determine entertainment settings. For example, in the Hue Sync application, the user can set the type of application (games/music/video) and the intensity of the effects (subtle/moderate/high/intense). Based on the names of the lights and/or groups, the system may be able to determine reasonable defaults, e.g.

"TV"=>use "video" and "high"
"relax"=>use "music" and "subtle"
"game corner"=>use "games" and "intense"

The naming of the devices in the lighting system may also be used for scene mapping. Scene mapping refers to a smart way of mapping the light settings/colors of a light scene to the available lighting devices. The scene mapping engine could, in addition to information that is stored in the lights (e.g. lamp type, location), use user-defined lighting device names for scene mapping. For example, if a user names his bulb "kitchen table" it is assumed it is placed above a kitchen table and preferably a whitepoint is mapped to this lamp. Similarly, if a user names is light "spot on wall" it can be assumed it as a more decorative purpose and a color value is mapped to this light.

The embodiments described above have been described with respect to a lighting system but may also be applied to other types of configurable systems, e.g. a Heating, Ventilation and Air-Conditioning (HVAC) system in which sensors and actuators are named and/or a system for controlling blinds in which blind controllers and switches to control them are named.

Figure 8:
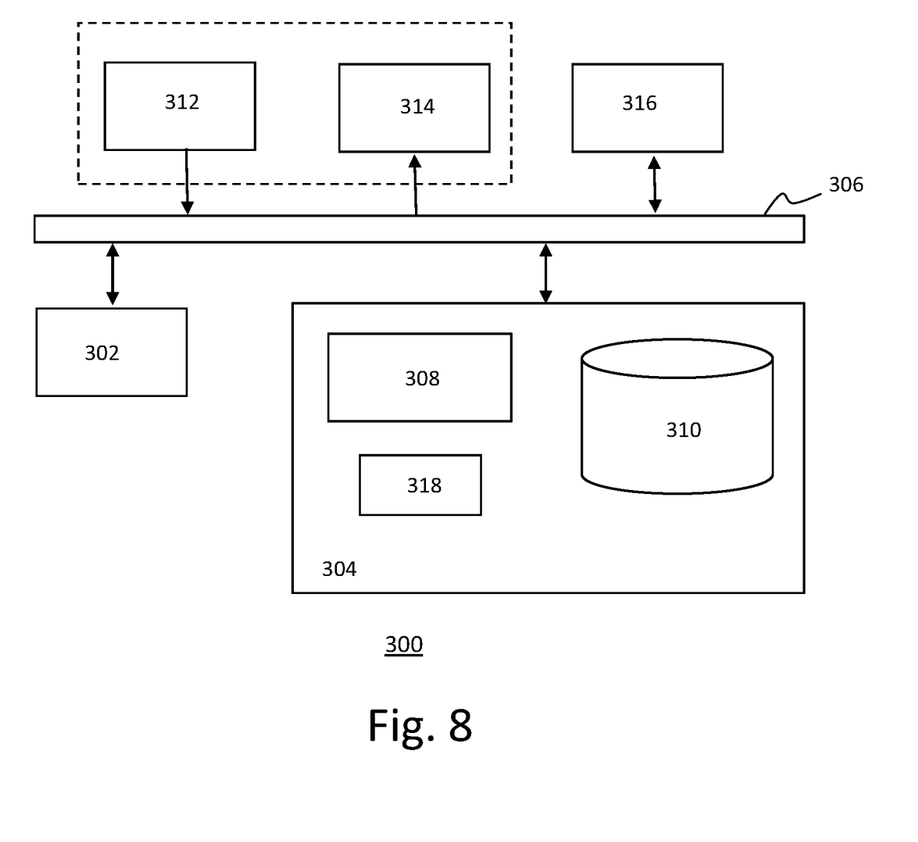
FIG. 8 is a block diagram of an exemplary data processing system for performing the method of the invention.

FIG. 8 depicts a block diagram illustrating an exemplary data processing system that may perform the method as described with reference to FIGS. 7 and 9.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for configuring a configurable system, said configurable system comprising a plurality of devices, said plurality of devices having been given names, said system comprising:
   at least one input interface;
   at least one configuration interface; and
   at least one processor configured to:
     use said at least one input interface to obtain said names given to said plurality of devices,
     determine which of said plurality of devices have similarities in their names,
     determine a group comprising a subset of said plurality of devices based on said similarities, said subset comprising multiple devices which have similarities in their names, and
     use said at least one configuration interface to define said group in said configurable system by configuring said configurable system,
   wherein said multiple devices comprise one or more lighting devices, said multiple devices further comprise one or more sensor devices and/or one or more user input devices, and said at least one processor is configured to determine said group in dependence on said similarities between said names of said multiple devices exceeding a threshold value, and wherein said at least one processor is configured to configure said configurable system to control at least one of said one or more lighting devices based on sensor data when said sensor data is produced by at least one of said one or more sensor devices and/or based on user input when said user input is received by said one or more user input devices.

2. A system as claimed in claim 1, wherein said at least one processor is configured to determine said group upon determining that one of said obtained names has changed.

3. A system as claimed in claim 1, wherein said at least one processor is configured to determine a spatial location of a device of said plurality of devices based on said name given to said device.

4. A system as claimed in claim 1, wherein said multiple devices comprise at least two devices having a same or similar prefix or word in their names.

5. A system as claimed in claim 1, wherein said names of said multiple devices are indicative of the same room and said at least one processor is configured to determine, for said group, a group name which identifies said room.

6. A system as claimed in claim 1, wherein at least one of said names was given by a user.

7. A system as claimed in claim 1, wherein said at least one processor is configured to obtain at least one of said names from at least one of said plurality of devices.

8. A system as claimed in claim 1, wherein said at least one processor is configured to determine a group name for said group based on said similarities.

9. A system as claimed in claim 1, wherein said at least one processor is configured to use said at least one input interface to obtain spatial positions, functions and/or types of said plurality of devices, and determine said subset of devices by determining which of said plurality of devices have similarities in their names and are similar with respect to their spatial position, function and/or type.

10. A method of configuring a configurable system, said configurable system comprising a plurality of devices, said plurality of devices having been given names, said method comprising:
   obtaining said names given to said plurality of devices;
   determining which of said plurality of devices have similarities in their names;
   determining a group comprising a subset of said plurality of devices based on said similarities, said subset comprising multiple devices which have similarities in their names, and determination of said group being made in dependence on said similarities between said names of said multiple devices exceeding a threshold value;
   defining said group in said configurable system by configuring said configurable system, wherein said multiple devices comprise one or more lighting devices, and wherein said multiple devices further comprise one or more sensor devices and/or one or more user input devices; and
   configuring said configurable system to control at least one of said one or more lighting devices based on sensor data when said sensor data is produced by at least one of said one or more sensor devices and/or based on user input when said user input is received by said one or more user input devices.

11. A non-transitory computer readable medium storing a computer program configured to perform the method of claim 10 on a processor when run.

* * * * *